United States Patent
Yang et al.

(10) Patent No.: US 10,261,644 B2
(45) Date of Patent: Apr. 16, 2019

(54) DISPLAY DEVICE AND DRIVING METHOD THEREOF

(71) Applicants: BOE Technology Group Co., Ltd., Beijing (CN); Beijing BOE Optoelectronics Technology Co., Ltd., Beijing (CN)

(72) Inventors: Ming Yang, Beijing (CN); Xiaochuan Chen, Beijing (CN); Wenqing Zhao, Beijing (CN); Qian Wang, Beijing (CN); Pengcheng Lu, Beijing (CN); Xiaoliang Ding, Beijing (CN); Haisheng Wang, Beijing (CN); Rui Xu, Beijing (CN); Lei Wang, Beijing (CN); Jian Gao, Beijing (CN); Xiaochen Niu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 51 days.

(21) Appl. No.: 15/513,774

(22) PCT Filed: Jul. 26, 2016

(86) PCT No.: PCT/CN2016/091740
§ 371 (c)(1),
(2) Date: Mar. 23, 2017

(87) PCT Pub. No.: WO2017/096916
PCT Pub. Date: Jun. 15, 2017

(65) Prior Publication Data
US 2018/0232075 A1    Aug. 16, 2018

(30) Foreign Application Priority Data
Dec. 9, 2015 (CN) .......................... 2015 1 0906674

(51) Int. Cl.
*G06F 3/041* (2006.01)
*G06F 3/044* (2006.01)
(Continued)

(52) U.S. Cl.
CPC .............. *G06F 3/044* (2013.01); *G01L 1/144* (2013.01); *G02B 27/2214* (2013.01);
(Continued)

(58) Field of Classification Search
CPC .......... G06F 3/041–3/047; G01L 1/144; G02F 1/13338; G02F 1/133308; G02F 2001/133317; G02F 2001/133334
(Continued)

(56) References Cited

U.S. PATENT DOCUMENTS

2010/0149128 A1  6/2010  No et al.
2014/0247239 A1* 9/2014  Jamshidi-Roudbari ...................... G06F 3/0414
345/174
2017/0031476 A1* 2/2017  Kung ...................... G06F 3/044

FOREIGN PATENT DOCUMENTS

CN     101446869 A    6/2009
CN     104992627 A    10/2015
(Continued)

OTHER PUBLICATIONS

Machine translation for CN104992627.*
(Continued)

*Primary Examiner* — Michael Pervan
(74) *Attorney, Agent, or Firm* — Banner & Witcoff, Ltd.

(57) ABSTRACT

Disclosed are a display device and a driving method thereof which can allow the display lighter and thinner. A display device includes: a middle frame, a panel component which is disposed on a side of the middle frame. The middle frame is made of a conductive material and is grounded; the
(Continued)

display device further includes a pressure detection unit; a pressure detection electrode is disposed between the two base substrates at the outermost sides of the panel component, and a capacitor is formed between the pressure detection electrode and the middle frame; the pressure detection unit is connected with the pressure detection electrode and the middle frame, respectively, and is configured for detecting a capacitance value between the pressure detection electrode and the middle frame.

19 Claims, 6 Drawing Sheets

(51) Int. Cl.
*G02F 1/1333* (2006.01)
*G09G 5/00* (2006.01)
*G01L 1/14* (2006.01)
*G02B 27/22* (2018.01)
*G02F 1/1347* (2006.01)
*G02F 1/29* (2006.01)

(52) U.S. Cl.
CPC .......... *G02F 1/1333* (2013.01); *G02F 1/1347* (2013.01); *G02F 1/13338* (2013.01); *G02F 1/29* (2013.01); *G06F 3/0412* (2013.01); *G06F 3/0416* (2013.01); *G09G 5/00* (2013.01); *G02F 1/133308* (2013.01); *G02F 2001/133317* (2013.01); *G02F 2001/133334* (2013.01); *G02F 2201/122* (2013.01); *G02F 2203/01* (2013.01); *G06F 2203/04105* (2013.01); *G06F 2203/04107* (2013.01)

(58) Field of Classification Search
USPC .................... 178/18.01–19.07; 345/173–178
See application file for complete search history.

(56) References Cited

FOREIGN PATENT DOCUMENTS

| CN | 204759381 U | 11/2015 |
| CN | 105404036 A | 3/2016 |
| CN | 205139521 U | 4/2016 |
| KR | 20090041793 A | 4/2009 |

OTHER PUBLICATIONS

Oct. 27, 2016—(WO) International Search Report and Written Opinion Appn PCT/CN2016/091740 with English Tran.

Jan. 2, 2018—(CN) First Office Action Appn 201510906674.2 with English Tran.

* cited by examiner

DISPLAY DEVICE AND DRIVING METHOD THEREOF

The application is a U.S. National Phase Entry of International Application No. PCT/CN2016/091740 filed on Jul. 26, 2016, designating the United States of America and claiming priority to Chinese Patent Application No. 201510906674.2 filed on Dec. 9, 2015. The present application claims priority to and the benefit of the above-identified applications and the above-identified applications are incorporated by reference herein in their entirety.

TECHNICAL FIELD

Embodiments of the present disclosure relate to a display device and a driving method thereof.

BACKGROUND

Application of a touch panel enables a user to implement operation on a host only by touching a display screen with a finger, so that a keyboard and a mouse are got rid of, and human-computer interaction is more straightforward.

According to different induction technologies, touch panels can be divided into four types: a resistive type, a capacitive type, an optical type and a sound wave type. The capacitive touch panel achieves a touch function by utilizing a capacitance change generated by the combination of the static electricity of a sense electrode and a human body, and the capacitive touch panel has good fireproof property, good antifouling property, good scratch resistance property, and faster response speed.

SUMMARY

A display device and a driving method thereof are provided in the embodiments of the present disclosure. In the case that an electrode layer is not additionally arranged, the display device can also detect the pressure value, so that the display device is lighter and thinner.

At least one embodiment of the present disclosure provides a display device, and the display device comprises: a middle frame, which is made of a conductive material; a panel component, which is disposed on a side of the middle frame; and a pressure detection unit; wherein the panel component comprises a first base substrate and a pressure detection electrode which is disposed on a side of the first base substrate away from the middle frame, and a capacitor is formed between the pressure detection electrode and the middle frame; and the pressure detection unit is connected with the pressure detection electrode and the middle frame respectively, and the pressure detection unit is configured for detecting a capacitance value between the pressure detection electrode and the middle frame.

For example, in the display device provided in one embodiment of the present disclosure, the middle frame is grounded.

For example, in the display device provided in one embodiment of the present disclosure, the panel component further comprises a second base substrate, and the second base substrate is disposed on a side of the pressure detection electrode away from the first base substrate.

For example, the display device provided in one embodiment of the present disclosure further comprises a circuit board, wherein the circuit board is disposed on a side of the middle frame away from the panel component.

For example, the display device provided in one embodiment of the present disclosure further comprises a spacer, wherein the spacer is disposed between the middle frame and the panel component.

For example, in the display device provided in one embodiment of the present disclosure, the spacer is made of an elastic material.

For example, in the display device provided in one embodiment of the present disclosure, the panel component comprises a first panel and a second panel which are stacked, the first panel is disposed between the second panel and the middle frame; and the first panel comprises the pressure detection electrode.

For example, in the display device provided in one embodiment of the present disclosure, the second panel is a liquid crystal display panel; and the first panel is a liquid crystal grating or a liquid crystal lens.

For example, in the display device provided in one embodiment of the present disclosure, the first panel comprises: a first substrate and a second substrate which are arranged oppositely, and liquid crystals disposed between the first substrate and the second substrate; the first substrate comprises: the first base substrate and a first electrode which is disposed on a side of the first base substrate close to the second substrate; the second substrate comprises: a second base substrate and a second electrode disposed on a side of the second base substrate close to the first substrate; the first electrode and the second electrode powered on enables the first panel to present grating stripes or liquid crystal lens; and the first substrate is close to the middle frame, the first base substrate is a base substrate of the panel component closest to the middle frame, and the pressure detection electrode is the first electrode.

For example, in the display device provided in one embodiment of the present disclosure, the pressure detection electrode comprises a plurality of sub electrodes arranged in an array; and the pressure detection unit is further configured for determining a touch position according to a capacitance between the sub electrodes and the middle frame and coordinates of the sub electrodes.

For example, in the display device provided in one embodiment of the present disclosure, the pressure detection electrode comprises a plurality of sub electrodes arranged in an array; and the pressure detection unit is further configured for determining a touch position according to a capacitance between the sub electrodes and the middle frame and coordinates of the sub electrodes.

For example, in the display device provided in one embodiment of the present disclosure, the first panel comprises: a first substrate and a second substrate which are arranged oppositely, and liquid crystals disposed between the first substrate and the second substrate; the first substrate comprises: the first base substrate and a first electrode which is disposed on a side of the first base substrate close to the second substrate; the second substrate comprises: a second base substrate and a second electrode which is disposed on a side of the second base substrate close to the first substrate; and in a case that the first electrode and the second electrode powered on enables the first panel to present liquid crystal lens, in the plurality of sub electrodes, a shading pattern is formed between every two adjacent sub electrodes located in a same column, and a width of the shading pattern is the same as a width of the sub electrode in a row direction.

For example, in the display device provided in one embodiment of the present disclosure, the pressure detection unit is further configured for determining a pressure level corresponding to the capacitance value between the pressure detection electrode and the middle frame according to the capacitance value between the pressure detection electrode and the middle frame and a corresponding relationship between the capacitance value and the pressure level.

At least one embodiment of the present disclosure further provides a driving method of the display device, and the driving method comprises: providing a first signal to the pressure detection electrode.

For example, in the driving method provided in one embodiment of the present disclosure, in a case that the pressure detection electrode comprises a plurality of sub electrodes arranged in an array, the first signal is a pulse signal.

At least one embodiment of the present disclosure further provides a driving method of the display device, and the driving method comprises: in a display phase, providing a second signal to the pressure detection electrode so as to enable the panel component to implement display; and in a touch pressure detection phase, providing a third signal to the pressure detection electrode.

For example, in the driving method provided in one embodiment of the present disclosure, in a case that the first electrode and the second electrode powered on enables the first panel to present grating stripes, in the display phase, a fourth signal is provided to the second electrode so as to enable the first panel to form the grating stripes; or, in a case that the first electrode and the second electrode powered on enables the first panel to present liquid crystal lens, in the display phase, a fifth signal is provided to the second electrode so as to enable the first panel to form the liquid crystal lens.

For example, in the driving method provided in one embodiment of the present disclosure, in the touch pressure detection phase, a sixth signal is provided to the second electrode, and the sixth signal is synchronized with the third signal of the pressure detection electrode.

For example, in the driving method provided in one embodiment of the present disclosure, in a case that the pressure detection electrode comprises a plurality of sub electrodes arranged in an array, the third signal is a pulse signal.

At least one embodiment of the present disclosure provides a display device and a driving method thereof, and the display device comprises: a middle frame, a panel component which is disposed on a side of the middle frame and a circuit board which is disposed on an other side of the middle frame, the middle frame is made of a conductive material and the middle frame is grounded; the display device further comprises a pressure detection unit; a pressure detection electrode is disposed between the two base substrates at the outermost sides of the panel component, and a capacitor is formed between the pressure detection electrode and the middle frame; the pressure detection unit is connected with the pressure detection electrode and the middle frame respectively, and the pressure detection unit is used for detecting a capacitance value between the pressure detection electrode and the middle frame. The larger the touch pressure, the smaller the distance between the pressure detection electrode and the middle frame, the greater the capacitance value between the pressure detection electrode and the middle frame, so that the capacitance value between the pressure detection electrode and the middle frame detected by the pressure detection electrode can determine the pressure. Compared with two layers of electrodes are arranged to detect the size of the pressure, a layer of electrode such as a pressure electrode arranged on the panel component in the embodiments of the present disclosure can detect the size of the pressure, so that a thickness of the display device is reduced.

BRIEF DESCRIPTION OF THE DRAWINGS

In order to clearly illustrate the technical solution of the embodiments of the disclosure or the prior art, the drawings of the embodiments or description in the prior art will be briefly described in the following. It is obvious that the described drawings are only related to some embodiments of the disclosure, and those skilled in the art can also obtain other drawings without any inventive work according to the drawings.

REFERENCE NUMERALS

2—middle frame; 3—panel component; 4—pressure detection unit; 5—spacer; 6—shading pattern; 7—liquid crystal; 8—circuit board; 10—touch panel; 11—base substrate; 12—drive electrode; 13—sense electrode; 14—touch electrode layer; 15—first insulating layer; 16—first pressure detection electrode; 17—second insulating layer; 18—second pressure detection electrode; 20—display device; 31—first base substrate; 32—second base substrate; 33—pressure detection electrode; 34—transparent adhesive; 35—second opposed base substrate; 36—first opposed base substrate; 37—first panel; 38—second panel; 39—second electrode; 331—sub electrode.

DETAILED DESCRIPTION

The technical solutions in the embodiments of the disclosure will be described in a clearly and fully understandable way in connection with the drawings related to the embodiments of the disclosure. It is obvious that the described embodiments are just a part but not all of the embodiments of the disclosure. Based on the embodiments in the disclosure, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "on," "under," "right," "left" and the like are only used to indicate relative position relationship, and when the position of the object which is described is changed, the relative position relationship may be changed accordingly.

Figure 1:
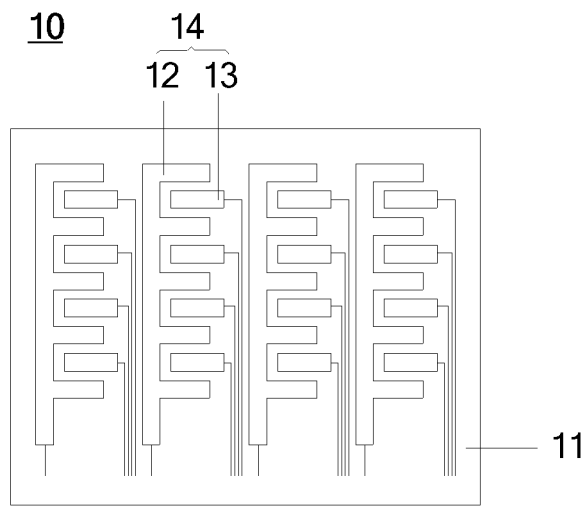
FIG. 1 is a schematic diagram of a touch panel.

As illustrated in FIG. 1, a touch panel 10 comprises a touch electrode layer 14 formed on a base substrate 11, and the touch electrode layer 14 comprises a drive electrode 12 and a sense electrode 13. The drive electrode 12 and the sense electrode 13 are disposed on a same layer, and a capacitance is formed between the drive electrode 12 and the sense electrode 13. In the case that a user touches the touch panel 10, at a touch position, the capacitance between the drive electrode 12 and the sense electrode 13 is changed, so that the touch position is detected.

Figure 2:
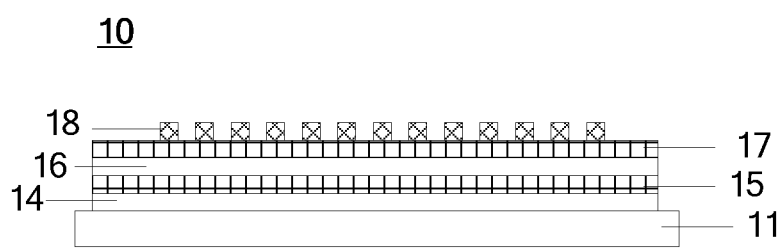
FIG. 2 is a schematic diagram of another touch panel.

For example, the touch panel 10 can further implement the detection of a touch pressure. For example, as illustrated in FIG. 2, the touch panel 10 further comprises a first pressure detection electrode 16 and a second pressure detection electrode 18. The first pressure detection electrode 16 is insulated from the touch electrode layer 14 by a first insulating layer 15. A second insulating layer 17 is arranged between the first pressure detection electrode 16 and the second pressure detection electrode 18. For example, the capacitance between the first pressure detection electrode 16 and the second pressure detection electrode 18 is inversely proportional to a distance between the first pressure detection electrode 16 and the second pressure detection electrode 18. When the user touches the touch panel 10, at the touch position, the distance between the first pressure detection electrode 16 and the second pressure detection electrode 18 is decreased, and at the touch position, the capacitance between the first pressure detection electrode 16 and the second pressure detection electrode 18 is increased. Therefore, by detecting the capacitance between the first pressure detection electrode 16 and the second pressure detection electrode 18, the touch pressure is determined.

Due to additional arrangements of the first pressure detection electrode 16, the second pressure detection electrode 18, the first insulating layer 15 and the second insulating layer 17 on the touch panel 10, a thickness of the touch panel 10 is increased, which does not in accordance with the development tendency of lighting and thinning of a product; moreover, the first pressure detection electrode 16 and the second pressure detection electrode 18 have a shielding effect on a touch signal of the touch electrode layer 14, so that a touch function of the touch panel 10 is influenced.

Figure 3:
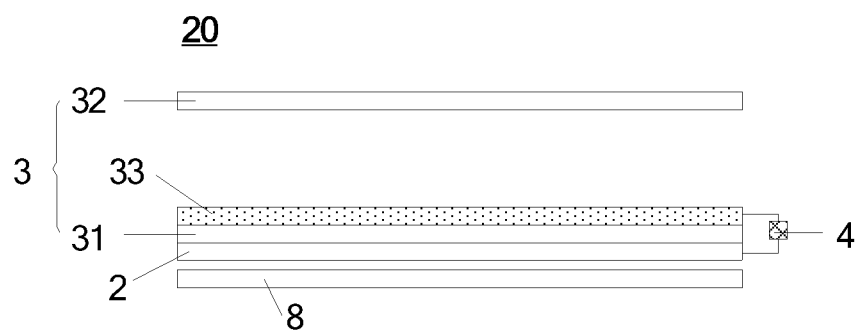
FIG. 3 is a schematic diagram of a display device provided by an embodiment of the present disclosure.

For example, as illustrated in FIG. 3, an embodiment of the present disclosure provides a display device 20, and the display device 20 comprises a middle frame 2, a panel component 3 which is disposed on a side of the middle frame 2, and a circuit board 8 disposed on another side of the middle frame 2. The middle frame 2 is made of a conductive material and the middle frame 2 is grounded.

For example, the display device 20 further comprises a pressure detection unit 4; a pressure detection electrode 33 is arranged between the two base substrates at the outermost sides of the panel component 3 (a first base substrate 31 close to the middle frame 2 and a second base substrate 32 relatively away from the middle frame 2 are included), that is the panel component comprises the first base substrate and the pressure detection electrode disposed on a side of the first base substrate away from the middle frame, the second base substrate is disposed on a side of the pressure detection electrode away from the first base substrate, and the pressure detection electrode 33 and the middle frame 2 can form a capacitor. In FIG. 3, other structures of the two base substrates at the outermost sides of the panel component 3 are not illustrated.

For example, the pressure detection unit 4 is connected with the pressure detection electrode 33 and the middle frame 2, respectively, and the pressure detection unit 4 is used for detecting a capacitance value between the pressure detection electrode 33 and the middle frame 2.

It should be noted that, the pressure detection electrode 33 is arranged between the two base substrates at the outermost sides of the panel component 3, and the pressure detection electrode 33, as illustrated in FIG. 3, for example is disposed on the first base substrate 31 close to the middle frame 2. Other base substrates can also be arranged between the two base substrates at the outermost sides, and the pressure detection electrode 33 can also be arranged on other base substrates. The pressure detection electrode 33 can be an electrode in an existing panel component, and can also be a layer of electrode additionally arranged for implementing pressure detection without limitation here.

For example, the panel component further comprises other thin films or layer structures. The embodiments and the drawings of the present disclosure only take related thin films or layer structures capable of illustrating invention points of the present disclosure for examples, and other structures are not illustrated one by one.

For example, a capacitor is generally formed by two conductors which are at a completely short distance and are insulated from each other. For example, no other conductive layers are arranged between the pressure detection electrode 33 and the middle frame 2, and the pressure detection electrode 33 and the middle frame 2 can form the capacitor.

It should be noted that, the display devices, such as a mobile phone, a tablet computer and the like, are all provided with the middle frame, a display panel is arranged on a side of the middle frame, the circuit board and the like are arranged on the other side of the middle frame, the middle frame is generally made of a metal (aluminium), and the middle frame is grounded. Compared to the case of detecting the pressure by arranging two layers of electrodes, according to the embodiments of the present disclosure, the pressure can be detected by arranging one layer of electrode, i.e. the pressure detection electrode, in the panel component to cooperate with the middle frame, so that a thickness of the display device can be reduced.

For example, edges of the middle frame, the panel component and the like are fixed on a border of the display device. In the case that the panel component of the display device is pressed, the distance between the pressure detection electrode 33 and the middle frame 2 in the panel component 3 is reduced, and the capacitance value between the pressure detection electrode 33 and the middle frame 2 is inversely proportional to the distance between the pressure detection electrode 33 and the middle frame 2, i.e., the greater the pressure, the shorter the distance between the pressure detection electrode 33 and the middle frame 2 and the greater the capacitance between the pressure detection electrode 33 and the middle frame 2. The pressure detection unit 4 detects the capacitance value between the pressure detection electrode 33 and the middle frame 2 so as to determine the pressure.

An embodiment of the present disclosure provides a display device, which comprises a middle frame, a panel component disposed on a side of the middle frame and a circuit board disposed on the other side of the middle frame; the middle frame is made of a conductive material, and the middle frame is grounded; the display device further comprises a pressure detection unit; a pressure detection electrode is arranged between two base substrates at the outermost sides of the panel component, and a capacitor is formed between the pressure detection electrode and the middle frame; and the pressure detection unit is connected with the pressure detection electrode and the middle frame respectively, and the pressure detection unit is used for detecting a capacitance value between the pressure detection electrode and the middle frame. The greater a touch pressure, the shorter a distance between the pressure detection electrode and the middle frame and the greater a capacitance between the pressure detection electrode and the middle frame, and thus, the pressure detection unit can determine the pressure by detecting the capacitance value between the pressure detection electrode and the middle frame. Compared to detecting the pressure by arranging two layers of electrodes in the prior art, according to the embodiment of the present disclosure, the pressure can be detected by arranging one layer of electrode, i.e., the pressure detection electrode in the panel component, so that a thickness of the display device is reduced.

The display device provided by the embodiment of the present disclosure, for example, is a mobile terminal. The display device provided by the embodiment of the present disclosure, for example, can be any product or component with a display function, e.g., a mobile phone, a tablet computer, a television, a display, a notebook computer, a digital photo frame, a navigator and the like.

Figure 4:
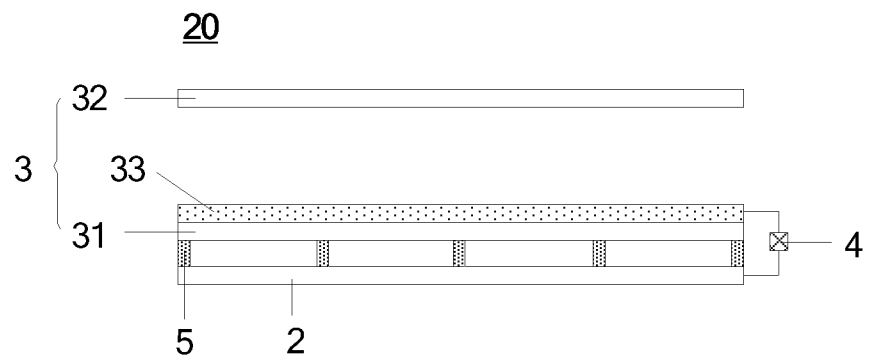
FIG. 4 is another schematic diagram of another display device provided by an embodiment of the present disclosure.

For example, as illustrated in FIG. 4, a spacer 5 is disposed between the middle frame 2 and the panel component 3. By the spacer 5, a certain space is formed between the middle frame 2 and the panel component 3. In the case that the display device is pressed, the distance between the pressure detection electrode 33 and the middle frame in the panel component 3 is reduced, the capacitance value between the pressure detection electrode 33 and the middle frame 2 is inversely proportional to the distance between the pressure detection electrode 33 and the middle frame 2, i.e., the greater the pressure, the shorter the distance between the pressure detection electrode 33 and the middle frame 2 and the greater the capacitance between the pressure detection electrode 33 and the middle frame 2.

For example, the spacer 5 illustrated in FIG. 4 is made of an elastic material. Therefore, in the case that the display device is pressed, the distance between the pressure detection electrode 33 and the middle frame 2 in the panel component 3 is changed more obviously, so that a change of the capacitance is greater, which is beneficial to the detection of the pressure.

Figure 5:
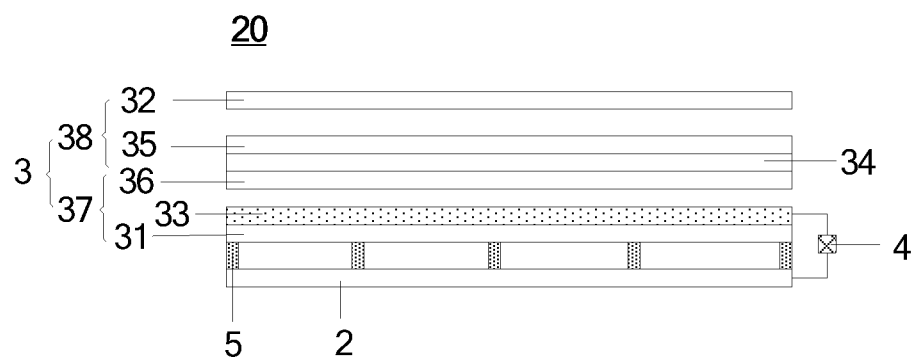
FIG. 5 is a specific schematic structural diagram of a display device provided by an embodiment of the present disclosure.

For example, as illustrated in FIG. 5, the panel component 5 comprises a first panel 37 and a second panel 38 which are stacked, and the first panel 37 is disposed between the second panel 38 and the middle frame 2; and the first panel 37 comprises the pressure detection electrode 33.

For example, as illustrated in FIG. 5, the first panel 37 comprises a first base substrate 31 of the two base substrates at the outermost sides of the panel component 3 close to the middle frame 2, a first opposed base substrate 36 and a first electrode 33. The second panel 38 comprises a second base substrate 32 of two base substrates at the outermost sides of the panel component 3 away from the middle frame 2, and a second opposed base substrate 35.

For example, a transparent adhesive 34 is arranged between the first panel 37 and the second panel 38, and the first panel 37 and the second panel 38 are adhered together by the transparent adhesive 34 to form the panel component 3.

In the embodiment of the present disclosure, the pressure detection electrode is disposed on the first base substrate of the two base substrates at the outermost sides of the panel component, which is close to the middle frame, so as to avoid influence on a pressure detection effect, which is caused by the arrangements of other conductive layers between the pressure detection electrode and the middle frame and no capacitor is formed between the pressure detection electrode and the middle frame.

For example, the second panel 38 is a liquid crystal display panel; and the first panel 37 is a liquid crystal grating or a liquid crystal lens.

For example, when the first panel 37 is the liquid crystal grating or the liquid crystal lens, the panel component 3 can be used for implementing 3D display. The liquid crystal grating separates images by forming light-transmitting and lightproof grating stripes, so that a left eye of the user receives a left-eye image and a right eye of the user receives a right-eye image, thereby naked-eye 3D display is implemented. The liquid crystal lens separates images by forming a lens, so that the left eye of the user receives the left-eye image and the right eye of the user receives the right-eye image, thereby naked-eye 3D display is implemented.

For example, in the case that the second panel is the liquid crystal display panel, the second panel, for example, comprises an array substrate and a color filter substrate, a first polarizer is arranged on a light incident side of the second panel, a second polarizer is arranged on a light emergent side of the second panel, and the absorption axes of the first polarizer and the absorption axes the second polarizer are perpendicular to each other. A third polarizer is arranged on a light incident side of the first panel, and the absorption axis the third polarizer is perpendicular to the absorption axis of the first polarizer.

Figure 6:
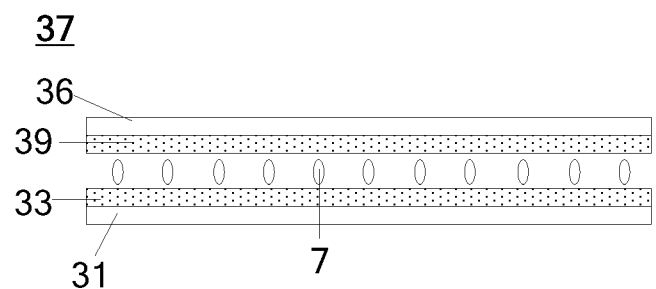
FIG. 6 is a schematic structural diagram of a first panel provided by an embodiment of the present disclosure.

For example, as illustrated in FIG. 6, the first panel 37 comprises: a first substrate and a second substrate which are oppositely arranged, and liquid crystals 7 disposed between the first substrate and the second substrate. The first substrate comprises: the first base substrate 31 and the first electrode 33 (i.e., the pressure detection electrode 33) in an inner side (i.e., a side of the first base substrate, which is close to the second substrate) of the first base substrate 31;

and the second substrate comprises: the first opposed base substrate 36 and a second electrode 39 in the inner side (i.e., a side of the second base substrate, which is close to the first substrate) of the first opposed base substrate 36. For example, the first electrode 33 and the second electrode 39 powered on enables the first panel to present grating stripes or liquid crystal lens.

For example, the first substrate is close to the middle frame, and the first base substrate 31, for example, is the substrate at the outermost side of the panel component (i.e., the first base substrate is the base substrate of the panel component closest to the middle frame); and the pressure detection electrode 33, for example, is the first electrode.

For example, according to the display device provided by the embodiment of the present disclosure, the pressure detection electrode is multiplexed with the first electrode on the first panel, i.e., in a display phase, the first electrode and the second electrode enables the first panel to present the grating stripes or present the liquid crystal lens; and in a touch pressure detection phase, the pressure detection electrode and the middle frame forms the capacitor. Therefore, other electrodes do not need to be additionally arranged on an existing display device, which is beneficial for implementing lighting and thinning of the display device.

For example, in the case that the first panel is a liquid crystal grating, the first electrode, for example, is a plate electrode, the second electrode, for example, is a strip electrode, an electric field is formed between the first electrode and the second electrode in the case that the first electrode and the second electrode are powered on, and the electric field drives the liquid crystals to deflect, so that the alternately dark and bright grating stripes are formed.

For example, the first electrode can be a strip electrode, and the second electrode can be a plate electrode.

For example, the first panel is the liquid crystal lens, the first electrode can be the plate electrode, the second electrode can be the strip electrode, the second electrode comprises a plurality of electrode groups, and each electrode group comprises a plurality of strip electrodes; an electric field is formed between the first electrode and the second electrode in the case that the first electrode and the second electrode are powered on, and the strip electrodes in each electrode group are different in voltage, so as to drive the liquid crystals to deflect to form the liquid crystal lens.

For example, the first electrode can be the strip electrode, and the second electrode can be the plate electrode.

Figure 7:
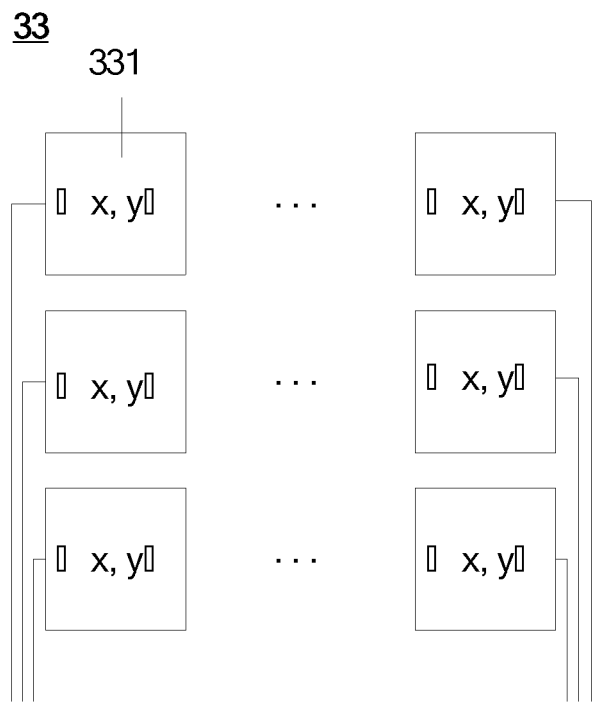
FIG. 7 is a schematic diagram of a pressure detection electrode provided by an embodiment of the present disclosure.

For example, as illustrated in FIG. 7, the pressure detection electrode 33 comprises a plurality of sub-electrodes 331 arranged in an array. The plurality of sub-electrodes 331 are arranged in an array, each sub electrode 331 has a two-dimensional coordinate (x, y). For example, the pressure detection unit is also used for determining the touch position according to the capacitance between the sub electrode and the middle frame and the coordinates of the sub electrode. Namely, the display device provided by the embodiment of the present disclosure can also determine the touch position by detecting the capacitance between the middle frame and the pressure detection electrode.

Figure 8:
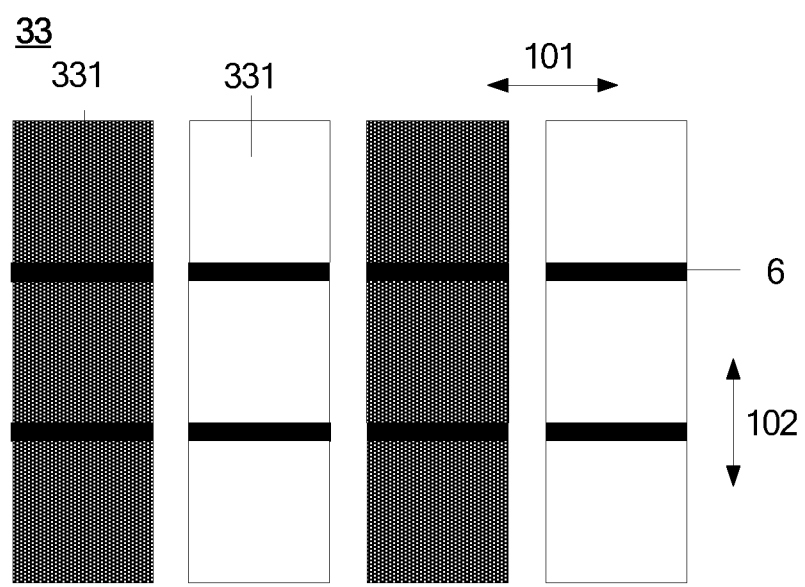
FIG. 8 is another schematic diagram of another pressure detection electrode provided by an embodiment of the present disclosure.

For example, in the case that the first electrode and the second electrode powered on enables the first panel to present grating stripes, as illustrated in FIG. 8, in the plurality of sub-electrodes 331, a shading pattern 6 is formed between every two adjacent sub electrodes 331 disposed in a same column (as illustrated in FIG. 7 the direction 102 is a column), and a width of each shading pattern 6 is the same as a width (a width of the direction 101 as illustrated in FIG. 7) of the sub electrode in a row direction.

For example, in a case that the first panel is the liquid crystal grating, because the plurality of sub electrodes form the grating stripes and the grating stripes include portions of light-transmitting columns of stripes and lightproof columns of stripes, which are arranged at intervals, and thus, in order to avoid light leakage of the lightproof columns of stripes between every two adjacent sub electrodes, according to the embodiment of the present disclosure, the shading pattern is formed between every two adjacent sub electrodes in the same column.

For example, the pressure detection unit is further used for determining the pressure level corresponding to the capacitance value between the pressure detection electrode and the middle frame according to the capacitance value between the pressure detection electrode and the middle frame and a corresponding relationship between the capacitance value and the pressure level.

For example, in accordance with the corresponding relationship between the stored capacitance value and the pressure level, e.g., a lookup table, the pressure detection unit determines the pressure level corresponding to the capacitance value between the pressure detection electrode and the middle frame according to the capacitance value between the pressure detection electrode and the middle frame and the corresponding relationship between the capacitance value and the pressure level so as to set specific operations under different pressures according to the corresponding pressure levels. For example, the lowest pressure level is set as a careless touch, and a corresponding operation is not executed.

An embodiment of the present disclosure provides a driving method of a display device, which comprises: providing a first signal to a pressure detection electrode so as to enable the pressure detection electrode and a middle frame to form a capacitor.

An embodiment of the present disclosure provides a driving method of a display device, in which a third signal is provided to a pressure detection electrode so as to enable the pressure detection electrode and a middle frame to form a capacitor, and by detecting a capacitance value between the pressure detection electrode and the middle frame a pressure is determined. Detection on a pressing strength can be implemented only by adding a layer of pressure detection electrode on the existing display device, which is beneficial to the lighting and thinning of the display device.

For example, in the case that the pressure detection electrode comprises a plurality of sub electrodes arranged in an array, the first signal is a pulse signal. Due to the array arrangement of the sub electrodes, in the case that the first signal is the pulse signal, the transverse electrodes can sequentially send out excitation signals, and the longitudinal electrodes can simultaneously receive the signals so as to further determine a touch position according to the capacitance.

Figure 9:
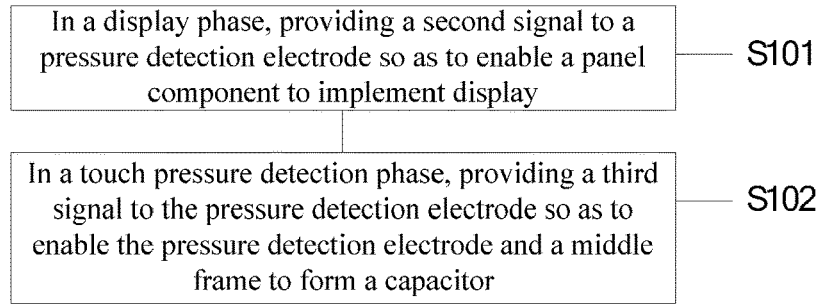
FIG. 9 is a schematic diagram of a driving method of a display device provided by an embodiment of the present disclosure.

An embodiment of the present disclosure provides a driving method of a display device, as illustrated in FIG. 9, the driving method includes the following operations:

S101: in a display phase, providing a second signal to a pressure detection electrode so as to enable a panel component to implement display.

S102: in a touch pressure detection phase, providing a third signal to the pressure detection electrode so as to enable the pressure detection electrode and a middle frame to form a capacitor.

For example, in the case that the third signal is a pulse signal or a constant voltage signal, the pressure detection electrode can form the capacitor with the middle frame.

A driving method of the display device is provided by the embodiment of the present disclosure, in the display phase, the second signal is provided to the pressure detection electrode so as to enable the panel component to implement display; and in the touch pressure detection phase, the third signal is provided to the pressure detection electrode so as to enable the pressure detection electrode and the middle frame to form the capacitor. By detecting a capacitance value between the pressure detection electrode and the middle frame, a pressing strength is determined. That is, in the embodiment of the present disclosure, in a case that no other thin films are added, the pressing strength can be detected.

For example, in the case that the pressure detection electrode comprises a plurality of sub electrodes arranged in an array, the third signal is the pulse signal. Due to array arrangement of the sub electrodes, in the case that the third signal is the pulse signal, the transverse electrodes can sequentially send out excitation signals, and the longitudinal electrodes can simultaneously receive the signals so as to further determine a touch position according to the capacitance value.

Figure 10:
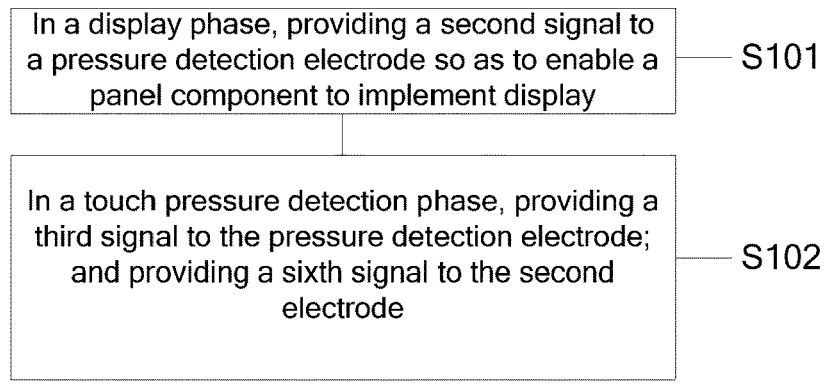
FIG. 10 is another schematic diagram of a driving method of a display device provided by an embodiment of the present disclosure.

For example, as illustrated in FIG. 10, the step S102 particularly is that: in the touch pressure detection phase, a sixth signal is provided to a second electrode, and in the touch pressure detection phase, the sixth signal of the second electrode is synchronized with the third signal of the pressure detection electrode. Signal synchronization of the second electrode and the pressure detection electrode can further shield a signal of a display panel.

For example, the sixth signal is the same as the third signal so as to further shield the signal of the display panel.

Figure 11:
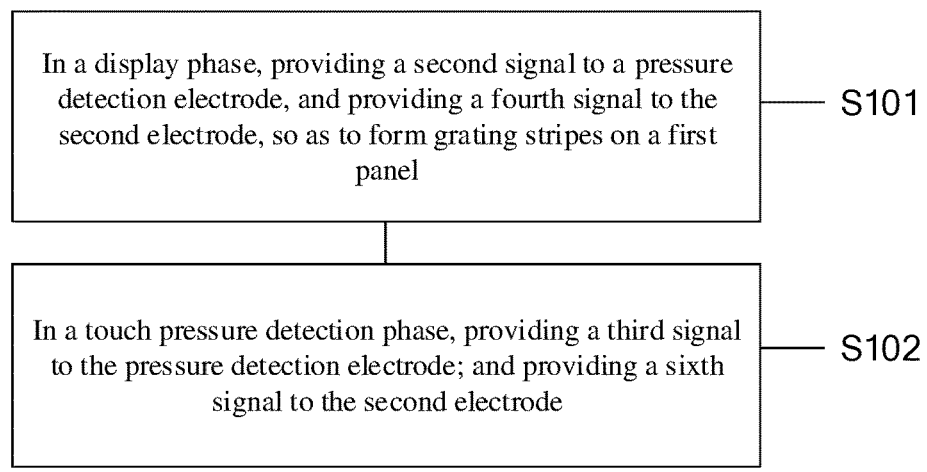
FIG. 11 is a schematic diagram of a driving method for a display device to implement 3D display provided by an embodiment of the present disclosure.

For example, in the case that a first panel is a liquid crystal grating, as illustrated in FIG. 11, the step S101 particularly is that: in the display phase, a fourth signal is provided to the second electrode so as to enable the first panel to form grating stripes.

Figure 13:
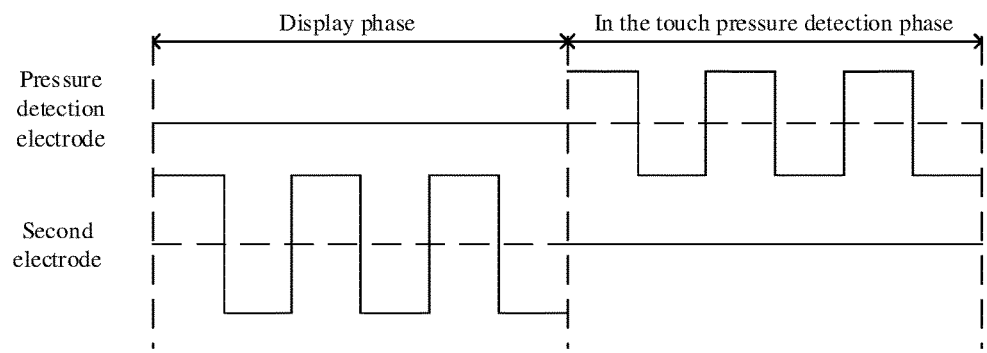
FIG. 13 is a schematic diagram of a drive signal provided by an embodiment of the present disclosure.

For example, as illustrated in FIG. 13, in the display phase, the second signal loaded to the pressure detection electrode has a constant voltage value, e.g., 0V; and the fourth signal loaded to the second electrode is a pulse signal, and the second signal and the fourth signal drive liquid crystals deflect to form the grating stripes. Moreover, the fourth signal is the pulse signal, and an electric field formed by the voltage of the second signal and a high level of the fourth signal and an electric field formed by the voltage of the second signal and a low level of the fourth signal are the same in size but opposite in direction, and the liquid crystal polarization can further be avoided, thereby a service life of a liquid crystal grating device is prolonged.

For example, in the touch pressure detection phase, a pulse signal (i.e., a third signal) is provided to the pressure detection electrode, and the capacitor is formed between the pressure detection electrode and the middle frame.

For example, as illustrated in FIG. 13, the step S102 particularly is that: in the touch pressure detection phase, a sixth signal is provided to the second electrode, and in the touch pressure detection phase, the sixth signal of the second electrode is synchronized with the third signal of the pressure detection electrode. Signal synchronization of the second electrode and the pressure detection electrode can further shield the signal of the display panel. In FIG. 13, the case that the sixth signal is a constant voltage signal is taken as an example.

Figure 14:
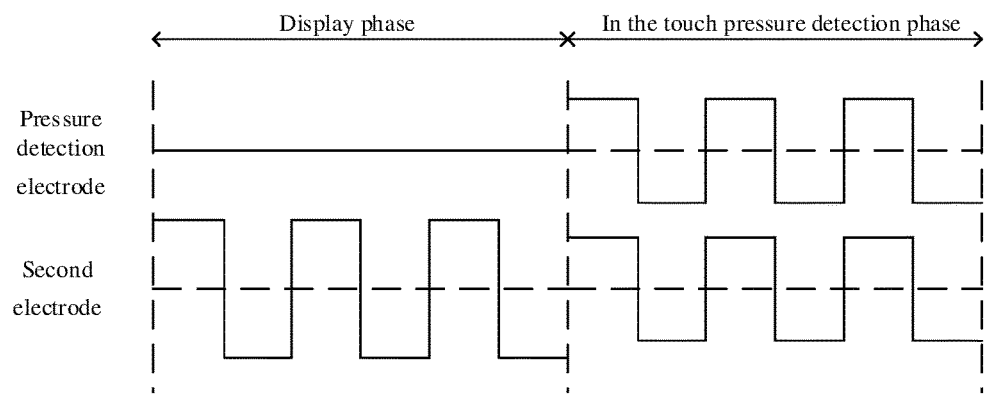
FIG. 14 is another schematic diagram of a drive signal provided by an embodiment of the present disclosure.

For example, as illustrated in FIG. 14, in the touch pressure detection phase, the sixth signal is provided to the second electrode, the sixth signal of the second electrode is synchronized with the third signal of the pressure detection electrode in the touch pressure detection phase, and the sixth signal is the same as the third signal, i.e., the sixth signal and the third signal are the same and both are the pulse signals, so that the signal of the display panel is further shielded.

Figure 12:
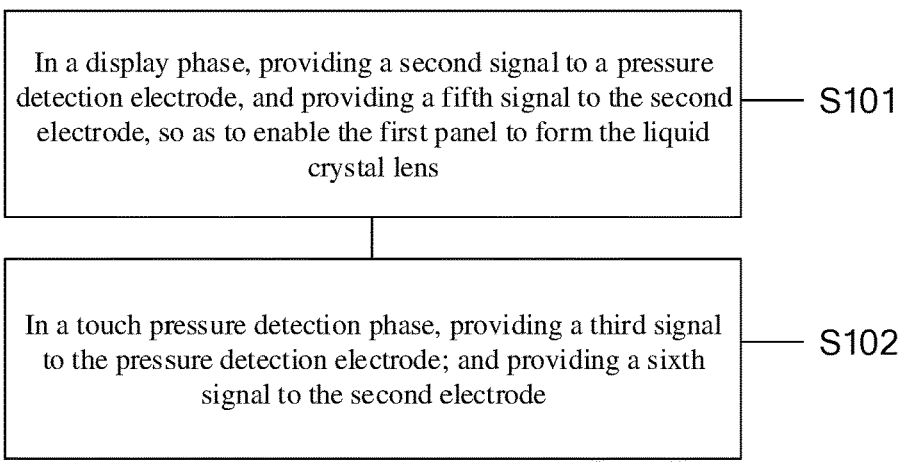
FIG. 12 is another schematic diagram of a driving method for a display device to implement 3D display provided by an embodiment of the present disclosure.

For example, in the case that the first panel is a liquid crystal lens, as illustrated in FIG. 12, the step S101 particularly is that: in the display phase, a fifth signal is provided to the second electrode so as to enable the first panel to form the liquid crystal lens.

For example, as illustrated in FIG. 12, the step S102 particularly is that: in the touch pressure detection phase, the sixth signal is provided to the second electrode, and in the touch pressure detection phase, the sixth signal of the second electrode and the third signal of the pressure detection electrode are synchronously driven. Signal synchronization of the second electrode and the pressure detection electrode can further shield the signal of the display panel.

For example, the sixth signal is the same as the third signal so as to further shield the signal of the display panel.

For example, the case that the first panel is the liquid crystal lens can refer to the description of the case that the first panel is the liquid crystal grating, and a principle of forming the liquid crystal lens can refer to the prior art, and detailed descriptions will be omitted here.

Figure 15:
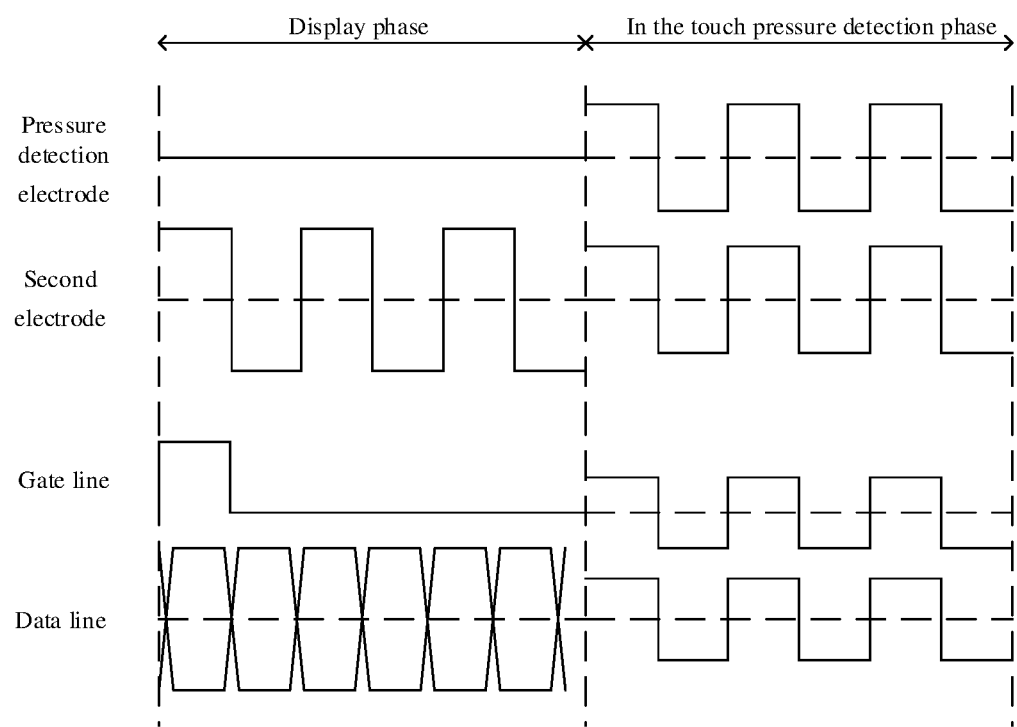
FIG. 15 is another schematic diagram of a drive signal provided by an embodiment of the present disclosure.

For example, the second panel is a liquid crystal display panel, the liquid crystal display panel comprises a plurality of gate lines and a plurality of data lines, and in the display phase, as illustrated in FIG. 15, a scanning signal is provided to the gate lines and a data driving signal is provided to the data lines so as to enable the liquid crystal display panel to implement display.

For example, in the touch pressure detection phase, a signal driving synchronously with the pressure detection electrode can be provided to the gate lines and the data lines so as to shield influence of the liquid crystal display panel on the first panel. For example, the same third signal driving synchronously with the pressure detection electrode is provided to the gate lines and the data lines so as to shield influence of the liquid crystal display panel on the first panel.

What are described above is related to the illustrative embodiments of the disclosure only and not limitative to the scope of the disclosure, and any variations or replacements which can be easily thought of by those skilled in the art in the technical scope of the disclosure shall fall within the scope of disclosure. Therefore, the scopes of the disclosure are defined by the accompanying claims.

The present application claims priority of the Chinese Patent Application No. 201510906674.2 filed on Dec. 9, 2015, the disclosure of which are incorporated herein by its reference in its entirety as part of the present application.

What is claimed is:

1. A display device, comprising:
   a middle frame, which is made of a conductive material;
   a panel component, which is disposed on a side of the middle frame;
   a plurality of spacers, disposed between the middle frame and the panel component, wherein the spacers are spaced apart from each other; and
   a pressure detection unit,
   wherein the panel component comprises a first base substrate and a pressure detection electrode which is disposed on a side of the first base substrate away from the middle frame, and a capacitor formed between the pressure detection electrode and the middle frame; and
   the pressure detection unit is connected with the pressure detection electrode and the middle frame, and the pressure detection unit is configured for detecting a capacitance value between the pressure detection electrode and the middle frame.

2. The display device according to claim 1, wherein the middle frame is grounded.

3. The display device according to claim 2, wherein the panel component further comprises a second base substrate, wherein the second base substrate is disposed on a side of the pressure detection electrode away from the first base substrate.

4. The display device according to claim 1, wherein the panel component further comprises a second base substrate, wherein the second base substrate is disposed on a side of the pressure detection electrode away from the first base substrate.

5. The display device according to claim 1, further comprising a circuit board, wherein the circuit board is disposed on a side of the middle frame away from the panel component.

6. The display device according to claim 1, wherein the spacers are made of an elastic material.

7. The display device according to claim 1, wherein the panel component comprises a first panel and a second panel which are stacked, the first panel is disposed between the second panel and the middle frame; and the first panel comprises the pressure detection electrode.

8. The display device according to claim 7, wherein the second panel is a liquid crystal display panel; and
the first panel is a liquid crystal grating or a liquid crystal lens.

9. The display device according to claim 7, wherein
the first panel comprises: a first substrate and a second substrate which are arranged oppositely, and liquid crystals disposed between the first substrate and the second substrate;
the first substrate comprises: the first base substrate and a first electrode which is disposed on a side of the first base substrate close to the second substrate;
the second substrate comprises: a second base substrate and a second electrode disposed on a side of the second base substrate close to the first substrate;
the first electrode and the second electrode, when powered on, enables the first panel to present grating stripes or a liquid crystal lens; and
the first substrate is close to the middle frame, the first base substrate is a base substrate of the panel component closest to the middle frame, and the pressure detection electrode is the first electrode.

10. A driving method of the display device according to claim 9, comprising:
in a display phase, providing a second signal to the pressure detection electrode so as to enable the panel component to implement display; and
in a touch pressure detection phase, providing a third signal to the pressure detection electrode.

11. The driving method according to claim 10, wherein
in a case that the first electrode and the second electrode, when powered on, enables the first panel to present grating stripes, in the display phase, a fourth signal is provided to the second electrode so as to enable the first panel to form the grating stripes; or,
in a case that the first electrode and the second electrode, when powered on, enables the first panel to present the liquid crystal lens, in the display phase, a fifth signal is provided to the second electrode so as to enable the first panel to form the liquid crystal lens.

12. The driving method according to claim 10, wherein, in the touch pressure detection phase, a sixth signal is provided to the second electrode, and the sixth signal is synchronized with the third signal of the pressure detection electrode.

13. The driving method according to claim 10, wherein, in a case that the pressure detection electrode comprises a plurality of sub electrodes arranged in an array, the third signal is a pulse signal.

14. The display device according to claim 7, wherein the pressure detection electrode comprises a plurality of sub electrodes arranged in an array; and
the pressure detection unit is further configured for determining a touch position according to a capacitance between the sub electrodes and the middle frame, and coordinates of the sub electrodes.

15. The display device according to claim 14, wherein
the first panel comprises: a first substrate and a second substrate, which are arranged oppositely, and liquid crystals disposed between the first substrate and the second substrate;
the first substrate comprises: the first base substrate and a first electrode which is disposed on a side of the first base substrate close to the second substrate;
the second substrate comprises: a second base substrate and a second electrode which is disposed on a side of the second base substrate close to the first substrate; and
in a case that the first electrode and the second electrode, when powered on, enables the first panel to a present liquid crystal lens, in the plurality of sub electrodes, a shading pattern is formed between every two adjacent sub electrodes located in a same column, and a width of the shading pattern is the same as a width of one sub electrode of the plurality of sub electrodes in a row direction.

16. The display device according to claim 1, wherein the pressure detection electrode comprises a plurality of sub electrodes arranged in an array; and
the pressure detection unit is further configured for determining a touch position according to a capacitance between the sub electrodes and the middle frame, and coordinates of the sub electrodes.

17. The display device according to claim 1, wherein the pressure detection unit is further configured for determining a pressure level corresponding to the capacitance value between the pressure detection electrode and the middle frame according to the capacitance value between the pressure detection electrode and the middle frame and a corresponding relationship between the capacitance value and the pressure level.

18. A driving method of the display device according to claim 1, comprising: providing a first signal to the pressure detection electrode.

19. The driving method according to claim 18, wherein in a case that the pressure detection electrode comprises a plurality of sub electrodes arranged in an array, the first signal is a pulse signal.

* * * * *